United States Patent [19]
Yoshida

[11] Patent Number: 6,087,810
[45] Date of Patent: Jul. 11, 2000

[54] CONSTANT CURRENT AND CONSTANT VOLTAGE BATTERY CHARGER

[75] Inventor: Takeshi Yoshida, Fukuoka, Japan

[73] Assignee: Matsushita Electric Industrial Co., Ltd., Osaka, Japan

[21] Appl. No.: 09/051,959

[22] PCT Filed: Oct. 23, 1996

[86] PCT No.: PCT/JP96/03091

§ 371 Date: Oct. 5, 1998

§ 102(e) Date: Oct. 5, 1998

[87] PCT Pub. No.: WO97/15977

PCT Pub. Date: May 1, 1997

[30] Foreign Application Priority Data

Oct. 24, 1995 [JP] Japan .................................. 7-275335

[51] Int. Cl.[7] .................................................... H02J 7/00
[52] U.S. Cl. .......................... 320/139; 320/160; 320/162
[58] Field of Search ................................... 320/139, 162, 320/163, 164, 160

[56] References Cited

U.S. PATENT DOCUMENTS

| | | | |
|---|---|---|---|
| 5,442,274 | 8/1995 | Tamai ....................................... | 320/146 |
| 5,576,608 | 11/1996 | Nagai et al. ............................. | 320/159 |
| 5,637,979 | 6/1997 | Tamai et al. ............................. | 320/116 |
| 5,777,457 | 7/1998 | Lee ......................................... | 320/137 |

FOREIGN PATENT DOCUMENTS

| | | |
|---|---|---|
| 3-251053 | 11/1991 | Japan . |
| 5-336679 | 12/1993 | Japan . |
| 6-113474 | 4/1994 | Japan . |
| 7-85893 | 3/1995 | Japan . |
| 2248735 | 4/1992 | United Kingdom . |

OTHER PUBLICATIONS

Japanese language search report for Int 'l Appln. No. PCT/JP96/03091 dated Feb. 4, 1997.
English translation of Japanese language search report.

*Primary Examiner*—Shawn Riley
*Assistant Examiner*—Gregory J. Toatley, Jr.
*Attorney, Agent, or Firm*—Ratner & Prestia

[57] ABSTRACT

A battery charger which can safely charge a lithium ion battery. Battery charger having a power source which supplies electric power, a charging control circuit for charging a battery by controlling the current and voltage based on supplied electric power, a charging current detection circuit for detecting a current value for charging the battery, a charging voltage detection circuit for detecting a voltage value for charging the battery, and a controller for holding a first voltage value which is a fixed voltage value for constant voltage charging, a second voltage value smaller than the first voltage value, a first current value which is a fixed current value for constant current charging, and a second current value smaller than the first current value. The battery charger controls the charging control circuit so as to perform I) constant current charging at the first current value until the voltage value detected by the charging voltage detection circuit reaches the second voltage value, ii) constant voltage charging at the second voltage value when the voltage value detected by the charging voltage detection circuit reaches the second voltage value, iii) constant current charging at the first current value again when the current value detected by the charging current detection circuit drops to the second current value, and iv) constant voltage charging at the first voltage value when the voltage value detected by the charging voltage detection circuit reaches the first voltage value, thereby charging the lithium ion battery.

16 Claims, 8 Drawing Sheets

6,087,810

1

CONSTANT CURRENT AND CONSTANT VOLTAGE BATTERY CHARGER

This application is a U.S. National Phase Application of PCT International Application PCT/JP96/03091.

FIELD OF THE INVENTION

The present invention relates to a charger, and more particularly to a constant-current/constant-voltage battery charger for charging a battery with a constant current and constant voltage.

BACKGROUND OF THE INVENTION

Recently, in an apparatus powered by a battery, primary cells that cannot be recharged, such as manganese primary cells, are being gradually replaced by secondary cells that may be recharged. These cells, such as nickel cadmium batteries and small sealed lead batteries may be used repeatedly. However, the secondary cell may have lower energy density than the primary cell, and hence to obtain the same cell capacity as the primary cell, a larger secondary cell may be required Accordingly, the secondary cell has been developed with increased capacity. Lately, the lithium ion battery capable of a much higher capacity than that of the nickel cadmium battery or small sealed lead battery has been introduced. This cell uses cobaltin lithium in the positive electrode and various compositions of carbon in the negative electrode. The resulting cell has a capacity 250 to 300% greater than the conventional nickel cadmium battery.

The lithium ion battery is generally charged by the constant current and constant voltage method similar to that of the lead battery. That is, it is charged at a constant current rate until the cell voltage reaches a set voltage value, and then charged at constant voltage thereafter. However, if the voltage charged is a little lower than an optimum value, then the lithium ion battery is under charged, and if the voltage charged is a little higher than an optimum value then the battery is overcharged. More specifically, when charged at a voltage exceeding 4.1 V in the lithium ion battery of which negative electrode is natural graphite material, or when charged at a voltage exceeding 4.2 V in the lithium ion battery of which negative electrode is coke material, these cells may be overcharged. The performance of an overcharged lithium ion battery deteriorates more quickly than a nickel cadmium battery. In a worst case, the lithium ions in the battery are formed in an acicular crystal structure called dendrite, and precipitate as metal lithium. This may penetrate through the separator, used as a partition between the positive electrode and negative electrode of the battery, possibly leading to a short-circuit in the battery, smoke or fire.

On the other hand, the constant-current/constant-voltage battery charger may be realized by using a resistance or series regulator, but it is often realized using a chopper circuit to satisfy efficiency and heat generation concerns.

A conventional constant-current/constant-voltage battery charger is described below by referring to the drawings in FIG. 9, FIG. 10A, and FIG. 10B.

FIG. 9 is a circuit diagram showing a constant-current/constant-voltage battery charger of the prior art. In FIG. 9, power source 1 supplies electric power for a chopper circuit 2. Chopper circuit 2 controls the charging current and charging voltage. Cell voltage detection circuit 5 detects the voltage of battery 6, such as a lithium ion battery, to be charged. Voltage controlled oscillator (VCO) has a variable oscillation frequency and depends on the applied voltage.

2

Amplifier 11 amplifies the detected cell voltage from the cell voltage detection circuit 5 which is delivered to the voltage controlled oscillator 9 as a control voltage. Current limiting resistor 12 limits the charging current during constant current charging.

FIG. 10A is a graph showing characteristics of cell voltage v and charging current i as a function of charging time t of a lithium ion battery using a constant-current/constant-voltage battery charger of the prior art. FIG. 10B is a magnified view of part A of FIG. 10A. In FIG. 10A and FIG. 10B, V1 is a set constant voltage charging value, i1 is a fixed constant current charging value, tc is a changeover point from constant current charging to constant voltage charging, and r is a ripple component of the cell voltage.

The operation of the constant-current/constant-voltage battery charger having such constitution as described in FIG. 9 and such characteristics as described in FIG. 10A and FIG. 10B, is described below. In the charger in FIG. 9, when the power source 1 is turned on it supplies electric power for a chopper circuit 2. The cell voltage detection circuit 5 detects the voltage of the lithium ion battery 6. This detected cell voltage is amplified by the DC amplifier 11 and provided to the voltage controlled oscillator 9. As a result, the voltage controlled oscillator 9 generates a signal having a certain frequency, and delivers it to the chopper circuit 2 as an oscillation signal. Chopper circuit 2 then starts to supply a charging voltage and a charging current. When the cell voltage of the lithium ion battery 6 is lower than the output voltage of the chopper circuit 2, the charging current is determined by the difference of the two voltages and the resistance value of the current limiting resistor 12, and charging is done at a nearly constant current i1. That is, the output voltage (charging voltage) of the chopper circuit 2 is controlled so that the charging current value may be a nearly constant current value i1 and the cell voltage value may become closer to the voltage value V1. Therefore, charging in this stage is constant current charging. As shown in FIG. 10A, at time tc, when the cell voltage value reaches a voltage value V1, namely when the cell voltage detection circuit 5 detects fixed voltage value V1, chopper circuit 2 is controlled to stop increasing the battery voltage, and charging is changed over to constant voltage charging.

In the constant-current/constant-voltage battery charger of the prior art, however, overcharging is likely to occur in the lithium ion battery due to the excessive movement of lithium ions due to ripple component r (see FIG. 10B) of the chopper circuit 2.

That is, in the constant-current/constant-voltage battery charger of the prior art, the cell voltage of the lithium ion battery 6 is detected by the cell voltage detection circuit 5, but the cell voltage includes the ripple voltage component in the voltage supplied from the chopper circuit 2. This is shown in the magnified view shown in FIG. 10B. Chopper circuit 2 supplies current at a specific phase angle in a cyclic period to a capacitor in the chopper circuit 2. The current charges the capacitor, and in turn the chopper circuit 2 can then supply output voltage. Generally, the operating frequency of the chopper circuit 2 is selected from scores of kHz to hundreds of kHz in order to enhance the efficiency of the switching element and reduce the size of the inductor. Therefore, the ripple component of the output voltage is filtered by the capacitor, but any ripple component residue remaining in the charging voltage is supplied to the lithium ion battery 6.

When the lithium ion battery 6 is overcharged by the ripple component, as mentioned above, metal lithium may appear in the negative electrode or dendrite may be generated, which may possibly lead to an unsafe condition. On the market, meanwhile, there is a strong demand for increased capacity of secondary cells, and a charger capable of charging the large capacity lithium ion battery 6 safely and securely is needed.

SUMMARY OF THE INVENTION

To solve the above problems of the prior art charger, a constant-current/constant-voltage battery charger which can safely and securely charge a lithium ion battery is proposed. The battery charger is provided with a power source for supplying electric power, a charging control circuit for supplying the electric power generated by the power source into the battery by controlling the current and voltage, a charging current detection circuit for detecting the current value for charging the battery, a charging voltage detection circuit for detecting the voltage value for charging the battery, and control means holding a first voltage value which is a fixed voltage value for constant voltage charging, a second voltage value smaller than the first voltage value, a first current value which is a fixed current value for constant current charging, and a second current value smaller than the first current value, for i) controlling the charging control circuit so as to perform constant current charging at the first current value until the voltage value detected by the charging voltage detection circuit reaches the second voltage value, ii) perform constant voltage charging at the second voltage value when the voltage value detected by the charging voltage detection circuit reaches the second voltage value, iii) perform constant current charging at the first current value again when the current value detected by the charging current detection circuit drops to the second current value, and iv) then perform constant voltage charging at the first voltage value when the voltage value detected by the charging voltage detection circuit reaches the first voltage value.

DESCRIPTION OF THE PREFERRED EMBODIMENTS

First exemplary embodiment

Figure 1:
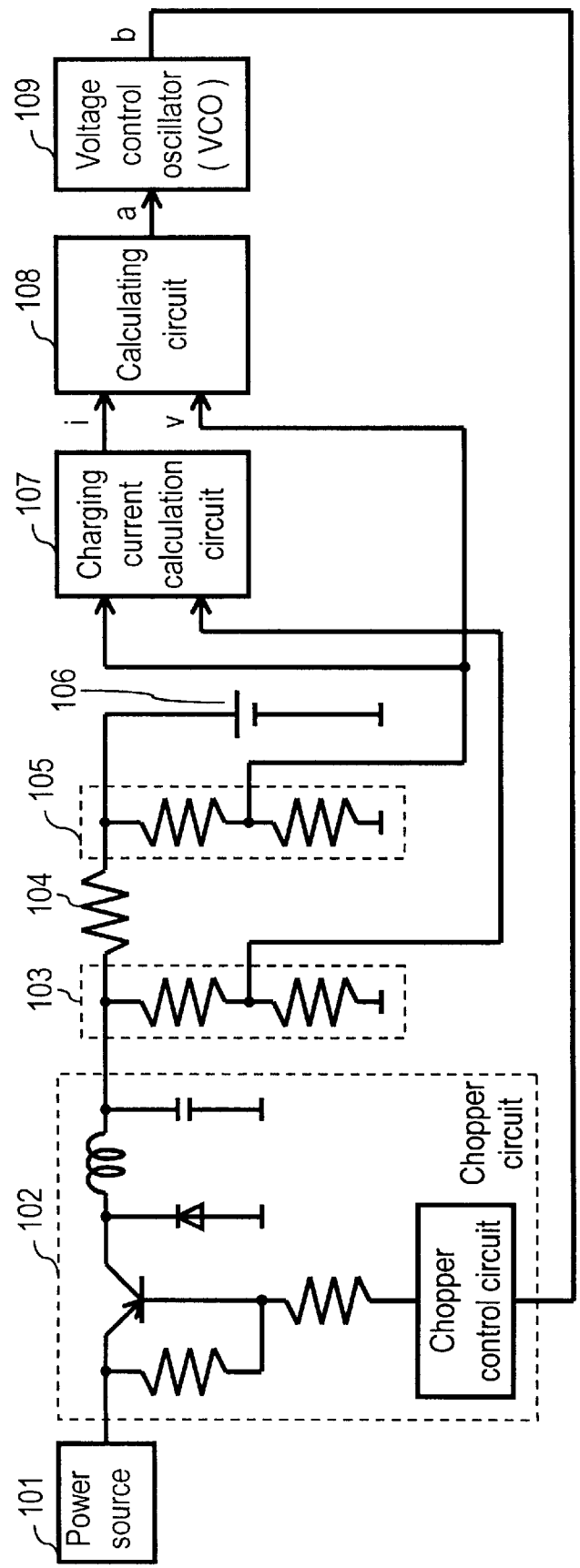
FIG. 1 is a circuit diagram showing a constant-current/constant-voltage battery charger according to the first to fourth exemplary embodiments of the present invention.

Referring now to the drawings, a constant-current/constant-voltage battery charger according to a first exemplary embodiment of the present invention is described in detail below. FIG. 1 is a circuit diagram showing the constant-current/constant-voltage battery charger in a first exemplary embodiment of the invention. In FIG. 1, power source 101 supplies electric power for a chopper circuit 102 which outputs a controlled charging voltage and functions as a charging control circuit. 105 is a cell voltage detection circuit, and 106 is a lithium ion battery to be charged. 103 is a charging voltage detection circuit for detecting a charging voltage which is an output voltage of the chopper circuit 102. 104 is a charging current detection circuit for detecting a charging current. 107 is a charging current calculation circuit for calculating a value i of the charging current from the charging voltage detected in the charging voltage detection circuit 103 and a value v of the cell voltage detected by the cell voltage detection circuit 105. 108 is a calculating circuit for issuing control voltage a for controlling the values v and i from the detected value v of cell voltage and calculated value i of the charging current. 109 is a voltage controlled oscillator (VCO) for outputting oscillation signal b at a frequency depending on the control voltage a issued from the calculating circuit 108 to the chopper circuit 102. The charging current calculation circuit 107, the calculating circuit 108 and the voltage controlled oscillator (VCO) 109 constitute control means for controlling the chopper circuit 102, using each detected signal of the charging voltage detection circuit 103, the charging current detection circuit 104 and the cell voltage detection circuit 105. The control means outputs control signals to the charging control circuit 102 for controlling the charging current and the charging voltage. This calculating circuit calculates the control voltage based on the charging current detected by the charging current detection circuit 103 and the charging voltage detected by the charging voltage detection circuit 105.

The operation of the constant-current/constant-voltage battery charger as configured above is described below. When starting to charge, power source 101 is turned on and supplies electric power. Then cell voltage detection circuit 105 detects the voltage value v of the lithium ion battery 106. The value of the charging voltage detected in the charging voltage detection circuit 103 and the value v of the cell voltage detected in the cell voltage detection circuit 105 are output to the charging current calculation circuit 107, and the charging current calculation circuit 107 calculates the value i of charging current using these values. The calculating circuit 108 outputs the control voltage a for controlling the values v and i of the cell voltage and charging current from the detected value v of cell voltage and calculated value of charging current to the voltage controlled oscillator 109. When the control voltage a is applied, the voltage controlled oscillator 109 oscillates a signal at a certain frequency depending on the control voltage a, and sends the oscillation signal b to the chopper circuit 102, thereby starting the charging process. In this way, the cell voltage is controlled by the calculating circuit 108, voltage controlled oscillator 109 and chopper circuit 102, based on the detected cell voltage value v and calculated charging current value i. Because the charger is a constant-current/constant-voltage battery charger, the charger first performs constant current charging, and finally performs constant voltage charging at the fixed cell voltage value, that is, the upper limit of the charging voltage. In intermediate stages, various modes of constant current and constant voltage charging may be possible. In the final stage, therefore, constant voltage charging at the upper limit is effected, and when the value i of charging current in constant voltage charging in the final stage reaches a certain current value smaller than the current value of constant current charging, charging is terminated. That is, when the charging current value becomes smaller in constant voltage charging, it indicates that it is close to full charging at this constant voltage.

Figure 8:
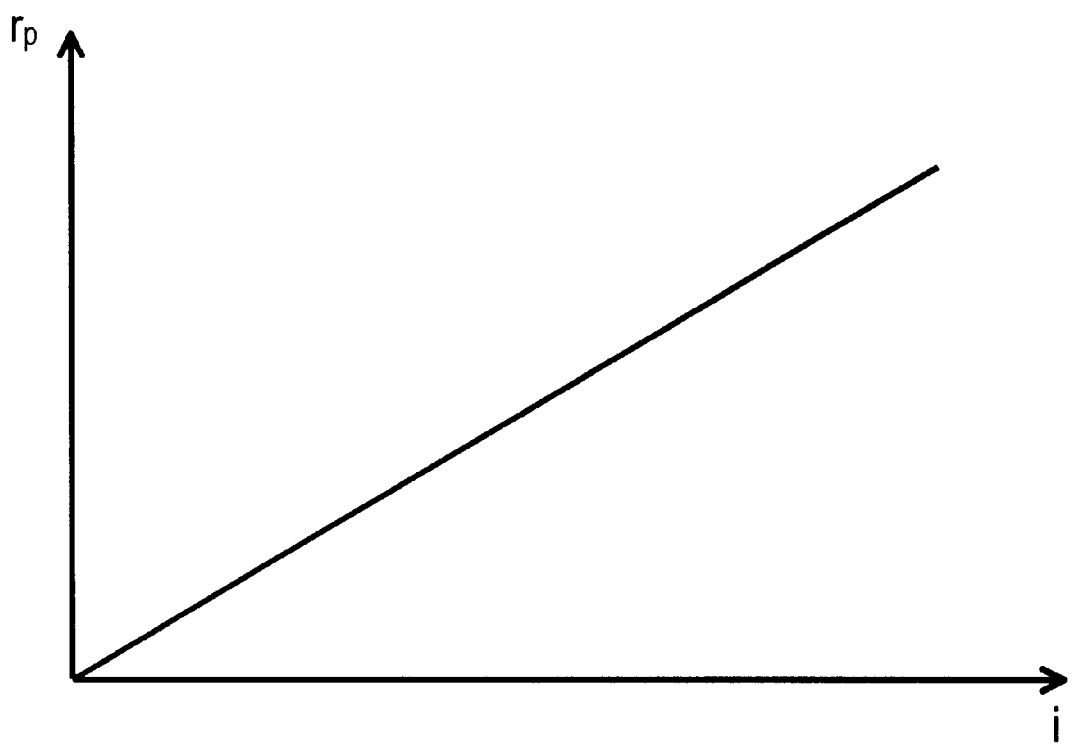
FIG. 8 is a graph showing the relationship between charging current and peak value of the ripple component.
Figure 9:
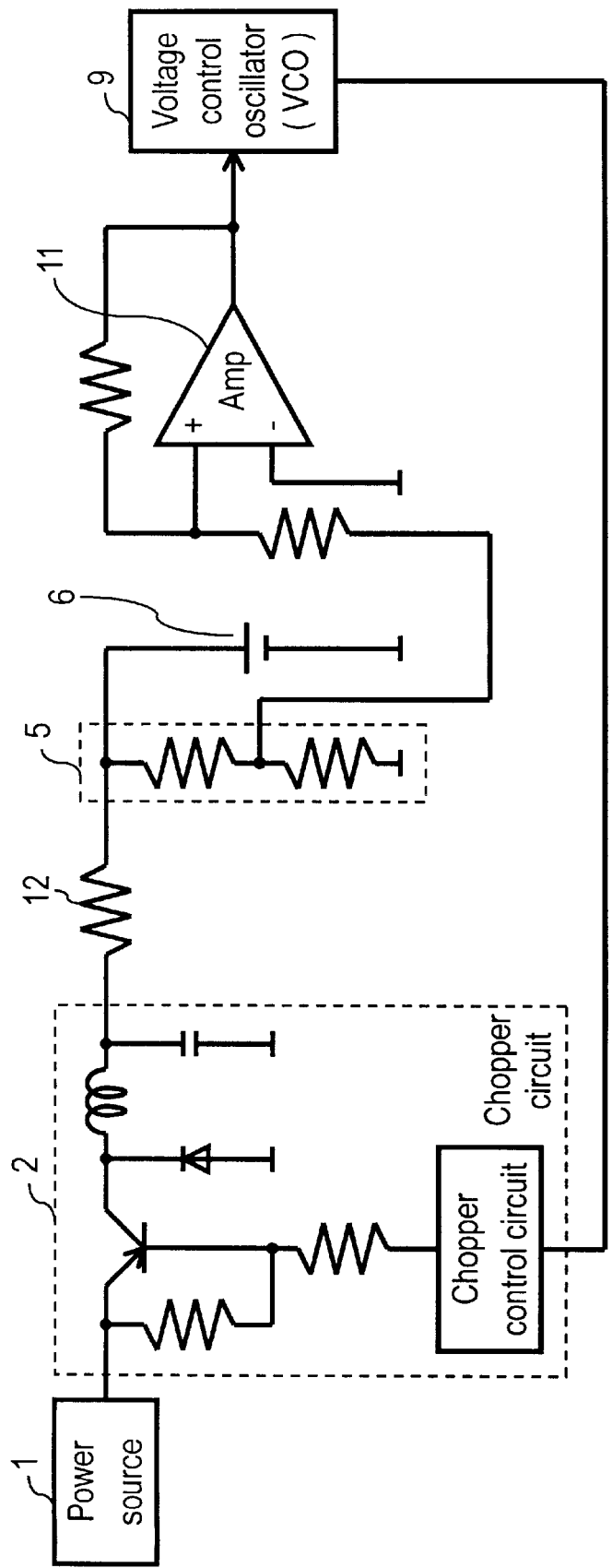
FIG. 9 is a circuit diagram showing a constant-current/constant-voltage battery charger of the prior art.
Figure 10A:
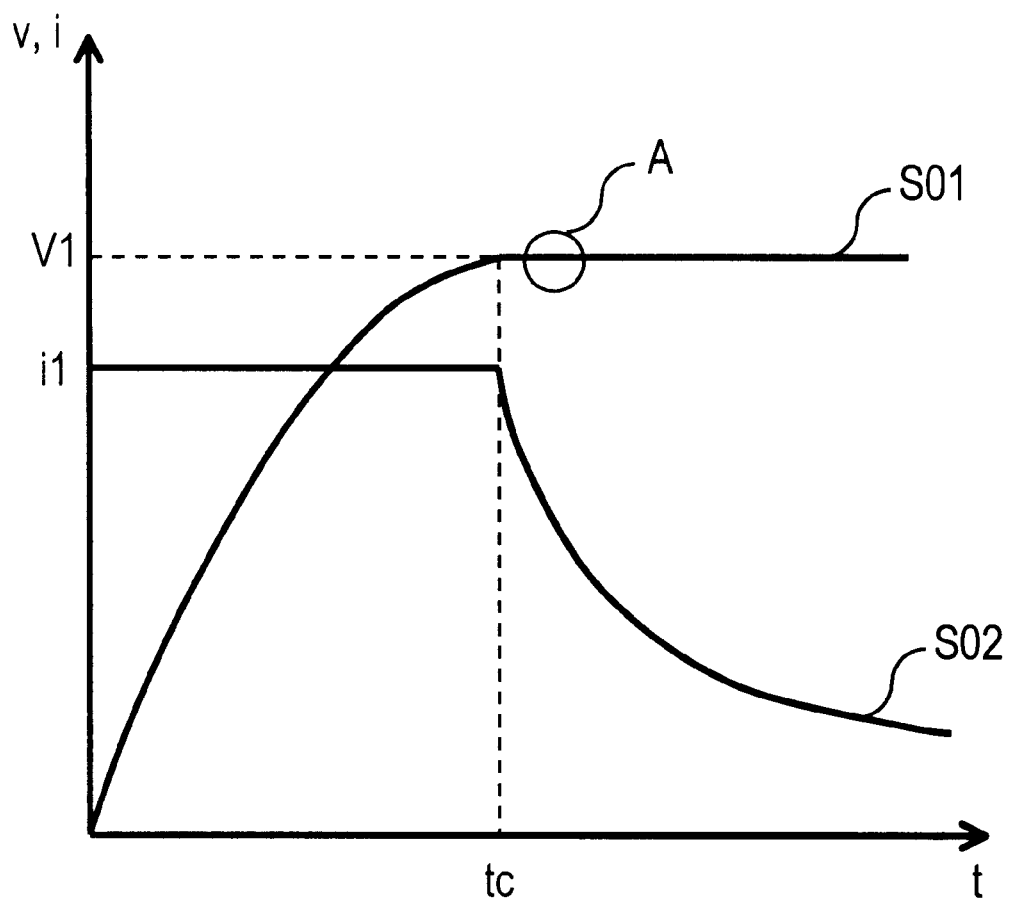
FIG. 10A is a graph showing characteristics of cell voltage and charging current of the current shown in FIG. 9.
Figure 10B:
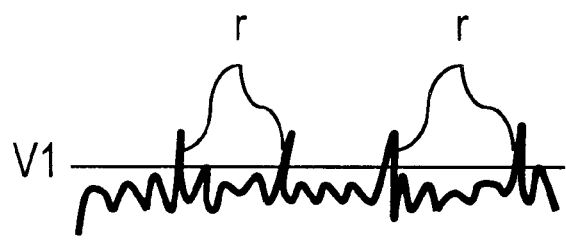
FIG. 10B is a magnified view of part A of FIG. 10A.

It is generally known that the ripple component in the output of the chopper circuit 102 is influenced by the current supplied to the load. FIG. 8 is a graph showing the relationship between charging current i and peak value $r_p$ of ripple component. As shown in FIG. 8, the larger the current i supplied to the load, the larger the peak value $r_p$ of the ripple component of the chopper circuit 102 becomes. In contrast, the smaller the current i supplied to the load, the better the controllability of the chopper circuit 102 becomes and the smaller the peak value $r_p$ of the ripple component becomes.

Thus, according to the exemplary embodiment, by sufficiently 20 charging at a constant current or by sufficiently charging at a constant voltage slightly below the upper limit of the charging voltage, then charging using a small charging current at the upper limit of charging voltage, namely in a condition of small ripple component, charging may be done at the upper limit at the point of high controlling precision of the chopper circuit 102. Therefore, the lithium ion battery 106 may not be overcharged, so that the lithium ion battery may be charged safely and securely.

Second exemplary embodiment

A constant-current/constant-voltage battery charger in a second exemplary embodiment of the present invention is described below.

The constant-current/constant-voltage battery charger of the second exemplary embodiment is similar to that shown in FIG. 1. The operation of the calculating circuit 108 is different from the first exemplary embodiment and, hence, mainly the operation of the calculating circuit 108 is described below.

Figure 2:
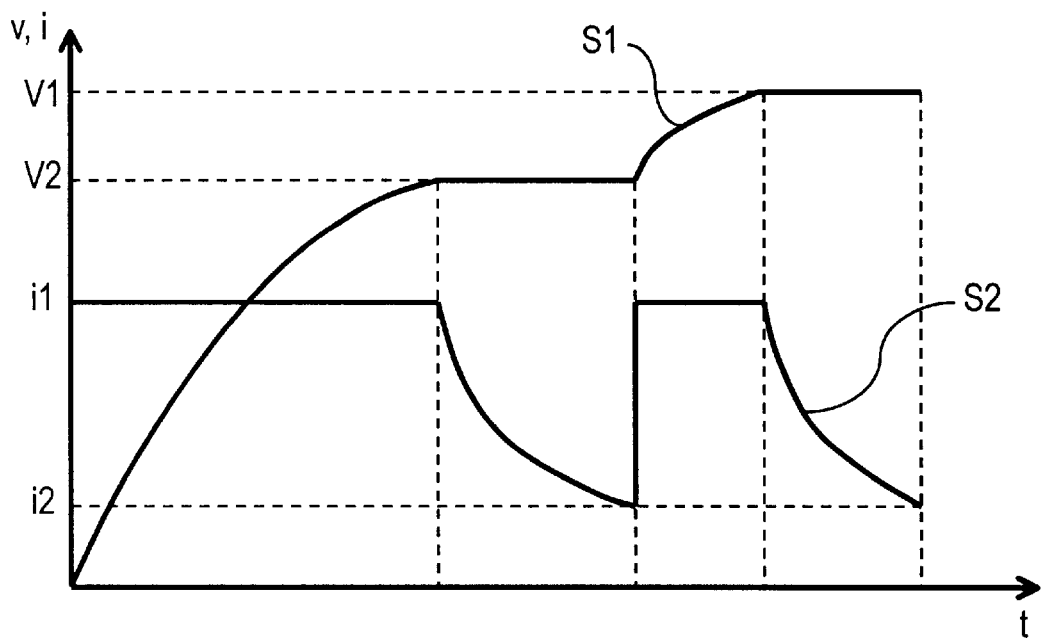
FIG. 2 is a graph showing characteristics of cell voltage and charging current according to a second exemplary embodiment of the present invention.

FIG. 2 is a graph showing the characteristics of the cell voltage v and charging current i with respect to charging time t in the second exemplary embodiment of the invention. In FIG. 2, S1 is a characteristic curve showing a cell voltage characteristic, and S2 is a characteristic curve showing a charging current characteristic.

In the constant-current/constant-voltage battery charger having the characteristics as shown in FIG. 2, the operation is described below mainly relating to the calculating circuit 108. In the calculating circuit 108, a first fixed voltage value V1 which is a fixed voltage value for constant voltage charging, a second fixed voltage value V2 smaller than the first fixed voltage value V1, a first fixed current value i1 which is a fixed current value for constant current charging, and a second fixed current value i2 smaller than the first fixed current value i1, are fixed. The calculating circuit 108 applies a control voltage a to the voltage controlled oscillator 109 so that the cell voltage may be 3.9 V for example when charging the lithium ion battery 106 having, for example, a negative electrode made from a natural graphite material, and so that the cell voltage may be 4.0 V for example when charging the lithium ion battery 106 having a negative electrode made from a coke material. Herein, the above 3.9 V or 4.0 V is the second fixed voltage value V2.

When the control voltage a is applied, the voltage controlled oscillator 109 oscillates a signal at a certain frequency corresponding to the control voltage a, and issues the oscillation signal b to the chopper circuit 102, thereby starting the charge process.

When the cell voltage of the lithium ion battery 106 is lower than the output voltage (charging voltage) of the chopper circuit 102, the charging current is determined by the difference of the two voltages and the resistance value of the charging current detection circuit 104, and charging is effected nearly at the first fixed current value i1. That is, the output voltage of the chopper circuit 102 is controlled so that the charging current value is nearly the first fixed current value i1, while the cell voltage value may become closer to the second fixed voltage value V2 over time. Therefore, charging in this stage is constant current charging. As shown in FIG. 2, when the cell voltage value reaches the second fixed voltage value V2, charging is changed over to constant voltage charging. At this point, in order that the value v of the cell voltage may be the second fixed voltage value V2, the control voltage a is applied from the calculating circuit 108 to the voltage controlled oscillator 109, and the oscillation signal b at a certain frequency for setting the cell voltage at a constant value is applied from the voltage controlled oscillator 109 to the chopper circuit 102. As a result, as the charging amount in the lithium ion battery 106 increases, the charging current gradually decreases, and the ripple voltage decreases.

During constant voltage charging so that the cell voltage value v may be equal to the second set voltage value V2, ripple voltage is contained in the output voltage of the chopper circuit 102, but the second fixed voltage value V2 is fixed lower than the first fixed voltage value V1 which is the upper limit of charging voltage of the lithium ion battery 106 (generally, 4.1 V when charging the lithium ion battery 106 with a negative electrode made of a natural graphite material, and 4.2 V when charging the lithium ion battery 106 with a negative electrode made of a coke material). In this exemplary embodiment, therefore, V1–V2=0.2 V. Accordingly, even the peak value of the ripple component in the output voltage of the chopper circuit 102 will not reach the upper limit V1 of the charging voltage. Therefore, the lithium ion battery 106 may not be overcharged.

In constant voltage charging at the second fixed voltage value V2, as shown in FIG. 2, the charging current gradually decreases. When the charging current value decreases to the second fixed current value i2, the calculating circuit 108 again applies the control voltage a to the voltage controlled oscillator 109 so that the charging current may be the first fixed current value i1. As a result, the oscillation signal b having a frequency such that the charging current value may be the first fixed current value i1, is provided from the voltage controlled oscillator 109 to the chopper circuit 102.

In constant current charging at the first fixed current value i1, as shown in FIG. 2, the value v of the cell voltage gradually increases. When the value v of the cell voltage reaches the first fixed voltage value V1, charging is changed over again to constant voltage charging. In this constant voltage charging, the control voltage a is applied from the calculating circuit 108 to the voltage controlled oscillator 109 such that the value v of the cell voltage may be the first fixed value V1, and the oscillation signal b, at a frequency such that the cell voltage may be the first fixed value V1, is applied from the voltage controlled oscillator 109 to the chopper circuit 102. As a result, as the charge quantity of the lithium ion battery 106 increases, the peak value of the ripple component is sufficiently small as to be ignored so that it may be regarded nearly same as the upper limit value V1 of charging voltage of the lithium ion battery 106. Therefore, the lithium ion battery 106 safely reaches the fixed cell voltage so as to be charged fully.

As shown in FIG. 2, charging is terminated when the charging current value i in the charging current calculation circuit 107 reaches the smallest second fixed current value i2.

Thus, according to the exemplary embodiment, by charging sufficiently at the second fixed voltage value V2, lower than the first fixed voltage value V1 of constant voltage charging (upper limit of charging voltage), and then charging at the first fixed voltage value V1, charging can be accomplished even when a small ripple component is present. Therefore, charging at the first fixed voltage value V1 is effected at the point of high control precision of the chopper circuit 102. At this high control precision, the peak voltage of the ripple component in the chopper circuit output voltage, that is the cell voltage, is sufficiently low such that the lithium ion battery 106 can be charged safely and securely without overcharging. Moreover, as the cell voltage value v approaches the first fixed voltage value V1, the ripple component decreases, and the cell voltage value v can reach the first fixed voltage value V1, so that full charging is realized.

Third exemplary embodiment

A constant-current/constant-voltage battery charger in a third exemplary embodiment of the present invention is described below. The constant-current/constant-voltage battery charger of the exemplary embodiment has the same circuits as shown in FIG. 1. The operation of the calculating circuit 108 is different from the first exemplary embodiment and, hence, mainly the operation of the calculating circuit 108 is described below.

Figure 3:
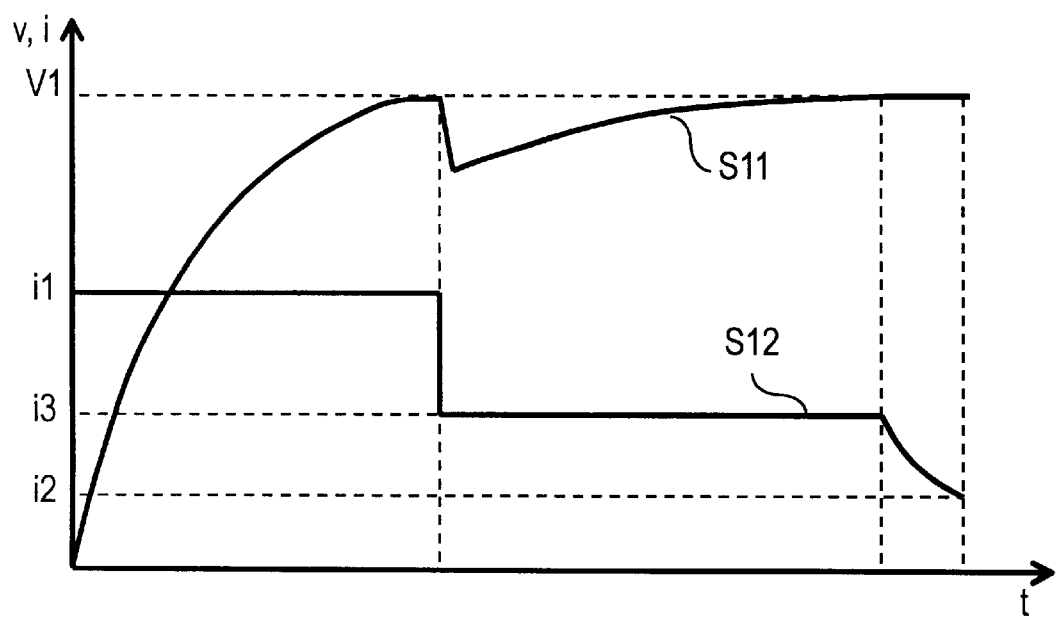
FIG. 3 is a graph showing characteristics of cell voltage and charging current according to a third exemplary embodiment of the present invention.

FIG. 3 is a graph showing the characteristics of the cell voltage v and charging current i with respect to charging time t in the third exemplary embodiment of the invention. In FIG. 3, S11 is a characteristic curve showing a cell voltage characteristic, and S12 is a characteristic curve showing a charging current characteristic.

In the constant-current/constant-voltage battery charger having the characteristics as shown in FIG. 3, the operation is described below mainly relating to the calculating circuit 108. In the calculating circuit 108, a fixed voltage value V1 (upper limit of charging voltage) is for constant voltage charging, a first fixed current value i1 which is a fixed current value for constant current charging, a second fixed current value i2 smaller than the first fixed current value i1, and a third fixed current value i3 smaller than the first fixed current value i1 and larger than the second fixed current value i2 are fixed. The calculating circuit 108 applies control voltage a to the voltage controlled oscillator 109 such that the cell voltage may be 4.1 V when charging the lithium ion battery 106 having, for example, a negative electrode of natural graphite material, and such that the cell voltage may be 4.2 V when charging the lithium ion battery 106 having negative electrode of coke material. Herein, the above value 4.1 V or 4.2 V is the fixed voltage value V1. When the control voltage a is applied, the voltage controlled oscillator 109 oscillates at a frequency corresponding to the control voltage a, and provides the oscillation signal b to the chopper circuit 102, thereby starting the charge process. When the cell voltage of the lithium ion battery 106 is lower than the output voltage of the chopper circuit 102, the charging current is determined by the difference of the two voltages and the resistance value of the charging current detection circuit 104. That is, the output voltage of the chopper circuit 102 is controlled such that the charging current value is nearly the first fixed current value i1, while the cell voltage value increases over time and may become closer to the second fixed voltage value V2. Therefore, charging in this stage is constant current charging. When the cell voltage value v reaches the fixed voltage value V1, as shown in FIG. 3, the control voltage a is applied from the calculating circuit 108 to the voltage controlled oscillator 109 such that the charging current value may be the third fixed current value i3, sufficiently smaller than the first fixed current value i1, and the oscillation signal b at a certain frequency for setting the charging current at a fixed value i3 is applied from the voltage controlled oscillator 109 to the chopper circuit 102.

As described in the second exemplary embodiment, generally the ripple component of the output voltage of the chopper circuit 102, namely the charging voltage, becomes larger, as the cell voltage of the battery charged becomes lower and the value of the charging current becomes larger. In contrast, the ripple component of the charging voltage becomes smaller, as the cell voltage of the battery charged becomes larger and the value of the charging current becomes smaller. Incidentally, as shown in FIG. 3, the cell voltage value momentarily reaches the fixed voltage value (upper limit of charging voltage) V1 when the charging current is switched from i1 to i3. As the cell voltage value charge is only momentary it does not lead to overcharging.

During constant current charging, such that the charging current value may be the fixed value i3, a ripple component is contained in the output voltage of the chopper circuit 102. However, the third fixed current value i3 is sufficiently smaller than the first fixed current value i1, and the ripple component is sufficiently small. Therefore, the peak voltage value of the ripple component may not reach the upper limit V1 of the charging voltage, so that the lithium ion battery 106 may not be overcharged.

As shown in FIG. 3, the charging current becomes smaller from i1 to i3, and the cell voltage temporarily drops, but rises again during the charging progress. When the cell voltage value v reaches V1 again, charging is changed over again to constant voltage charging. The control voltage a is applied from the calculating circuit 108 to the voltage controlled oscillator 109 such that the cell voltage value v may be a fixed value V1, and the oscillation signal b, fixed to a frequency such that the cell voltage value may be constant, is applied from the voltage controlled oscillator 109 to the chopper circuit 102. As a result, as the charge quantity of the lithium ion battery 106 increases, the charging current value i gradually decreases. At this time, as the ripple component of a voltage applied to the lithium ion battery 106, namely, the ripple component of the cell voltage, becomes sufficiently small until the value v of cell voltage reaches V1, the peak value of cell voltage of the lithium ion battery 106 may be nearly the same as the upper limit value V1 of cell voltage. Therefore, the lithium ion battery 106 safely reaches the specified cell voltage so as to be charged fully.

As shown in FIG. 3, charging is terminated when the charging current value i in the charging current calculation circuit 107 reaches the smallest second fixed current value i2.

Thus, according to the exemplary embodiment, by sufficiently charging at the constant current i3, lower than the first fixed current value i1 of initial constant current charging, then charging at the fixed voltage value (upper limit of charging voltage) V1, and charging at the fixed voltage value V1 is effected at the point of high control precision of the chopper circuit 102. At this high control precision, the peak voltage of ripple component in the chopper circuit output voltage is sufficiently low and, hence, the lithium ion battery 106 may be charged safely and securely without overcharging.

Fourth exemplary embodiment

A constant-current/constant-voltage battery charger in a fourth exemplary embodiment of the present invention is described below. The constant-current/constant-voltage battery charger of the exemplary embodiment has the same circuits as shown in FIG. 1. Only the operation of the calculating circuit 108 is different from the first exemplary embodiment and, hence, mainly the operation of the calculating circuit 108 is described below.

Figure 4:
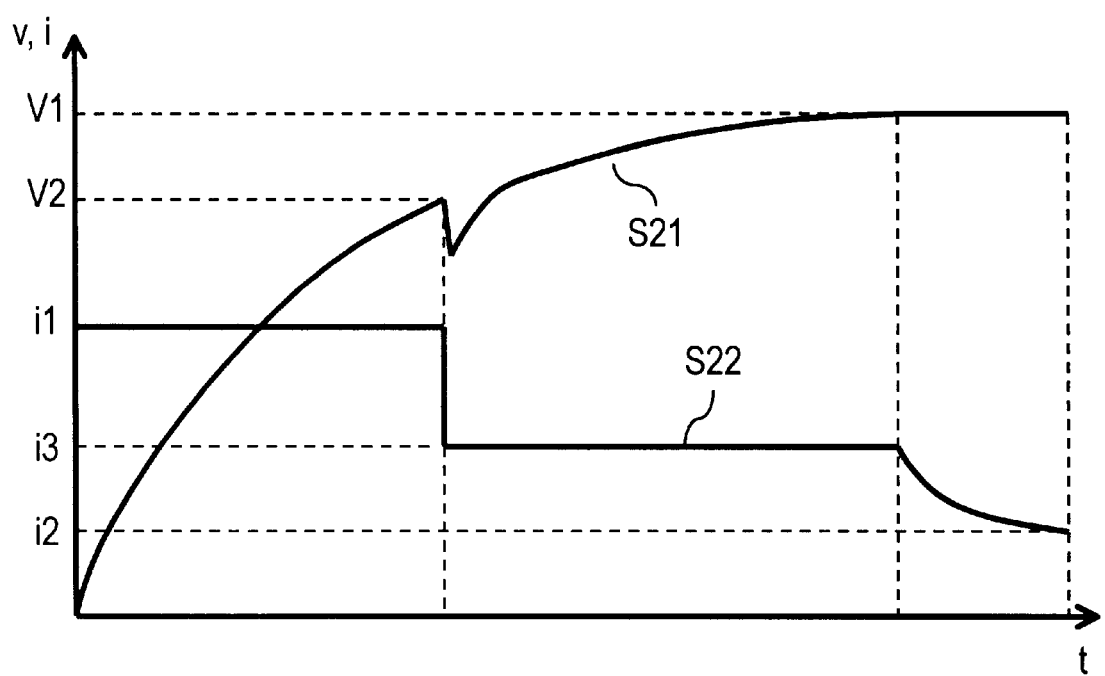
FIG. 4 is a graph showing characteristics of cell voltage and charging current according to a fourth exemplary embodiment of the present invention.

FIG. 4 is a graph showing the characteristics of the cell voltage v and charging current i with respect to charging time t in the fourth exemplary embodiment of the invention. In FIG. 4, S21 is a characteristic curve showing a cell voltage characteristic, and S22 is a characteristic curve showing a charging current characteristic.

The operation of the constant-current/constant-voltage battery charger having the characteristics as shown in FIG. 4 is described below mainly relating to the calculating circuit 108. In the calculating circuit 108, a first fixed voltage value V1 which is a fixed voltage value (upper limit of charging voltage) for constant voltage charging, a second fixed voltage value V2 smaller than the first fixed voltage value V1, a first fixed current value i1 which is a fixed current value for constant current charging, a second fixed current value i2 smaller than the first fixed current value i1, and a third fixed current value i3 smaller than the first fixed current value i1 and larger than the second fixed current value i2 are predetermined. The calculating circuit 108 applies control voltage a to the voltage controlled oscillator 109 such that the cell voltage may be 4.1 V when charging the lithium ion battery 106 having, for example, a negative electrode of natural graphite material, or such that the cell voltage may be 4.2 V when charging the lithium ion battery 106 having a negative electrode of coke material. Herein, the above value 4.1 V or 4.2 V is the first fixed voltage value V1. When the control voltage a is applied, the voltage controlled oscillator 109 oscillates a signal at a frequency corresponding to the control voltage a, and provides the oscillation signal b to the chopper circuit 102, thereby starting the charge process. When the cell voltage of the lithium ion battery 106 is lower than the output voltage of the chopper circuit 102, the charging current is determined by the difference of the two voltage and the resistance value of the charging current detection circuit 104, and charging is effected nearly at the first fixed current value i1. That is, the output voltage of the chopper circuit 102 is controlled so that the charging current value is nearly the first fixed current value i1, while the cell voltage value increases with time and may become closer to the second fixed voltage value V2. Therefore, charging in this stage is constant current charging.

When the cell voltage reaches the second fixed voltage value V2, lower than the first fixed voltage value V1 (for example, 3.9 V when charging the lithium ion battery 106 with negative electrode of natural graphite material, or 4.0 V when charging the lithium ion battery 106 with negative electrode of coke material), as shown in FIG. 4, the control voltage a is applied from the calculating circuit 108 to the voltage controlled oscillator 109 so that the charging current value may be the third fixed current value i3 sufficiently smaller than the first fixed current value i1, and the oscillation signal b, at a frequency for setting the charging current at a fixed value i3, is applied from the voltage controlled oscillator 109 to the chopper circuit 102.

During constant current charging such that the charging current value may be the fixed value i3, ripple may be contained in the output voltage of the chopper circuit 102, the third fixed current value i3 is fixed sufficiently smaller than the first fixed current value i1 such that the ripple component is sufficiently small in comparison. Therefore, the peak voltage value of the ripple component may not reach the upper limit V1 of the charging voltage, so that the lithium ion battery 106 may not be overcharged.

As shown in FIG. 4, the charging current becomes smaller from i1 to i3, and the cell voltage temporarily drops, but rises again during the charging progress. When the cell voltage value v reaches V1, charging is changed over again to constant voltage charging. The control voltage a is applied from the calculating circuit 108 to the voltage controlled oscillator 109 such that the cell voltage value v may be a fixed value V1, and the frequency of oscillation signal b is fixed such that the cell voltage value may be constant, is provided from the voltage controlled oscillator 109 to the chopper circuit 102. As a result, as the charge quantity of the lithium ion battery 106 increases, the charging current value i gradually decreases, the phase angle of chopper circuit 102 decreases and the ripple component in the output voltage of the chopper circuit 102 is sufficiently small. Thus, the peak value of the ripple component is small enough to be ignored so that the battery voltage may be regarded as nearly the same as the upper limit value V1 of the charging voltage of the lithium ion battery 106. Therefore, the lithium ion battery 106 safely reaches the fixed cell voltage so as to be charged fully.

As shown in FIG. 4, charging is terminated when the charging current value i in the charging current calculation circuit 107 reaches the smallest second fixed current value i2.

Thus, according to the exemplary embodiment, by charging sufficiently at the constant current i3, lower than the first fixed current value i1 of initial constant current charging, and then charging at the fixed voltage value (upper limit of charging voltage) V1, the peak voltage of the ripple component of the chopper circuit output voltage is sufficiently low and charging at the first fixed voltage value V1 is effected at the point of high control precision of the chopper circuit 102, so that the lithium ion battery 106 can be charged safely and securely without overcharging.

Fifth exemplary embodiment

A constant-current/constant-voltage battery charger according to fifth and sixth exemplary embodiments of the present invention are described below while referring to FIG. 5 through FIG. 7.

Figure 5:
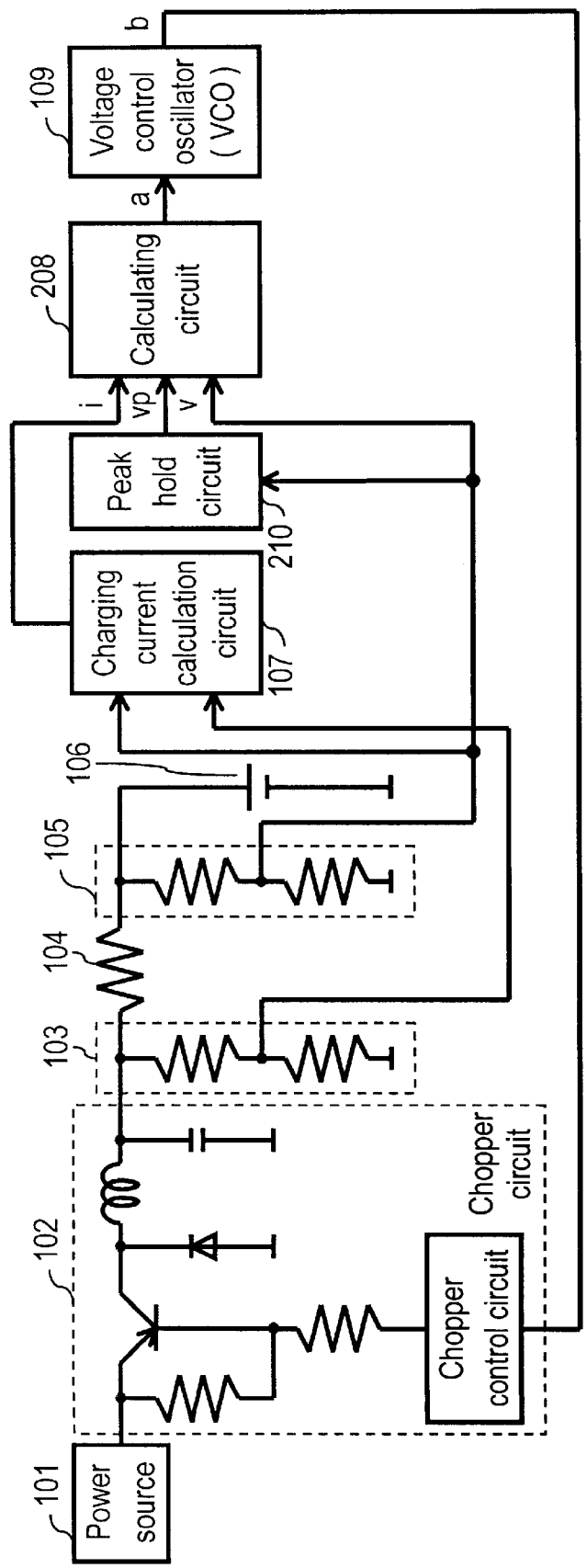
FIG. 5 is a circuit diagram showing a constant-current/constant-voltage battery charger according to a fifth and sixth exemplary embodiment of the invention.

FIG. 5 is a circuit diagram showing the constant-current/constant-voltage battery charger of the fifth exemplary embodiment of the invention. In FIG. 5, reference numeral 101 is a power source, 102 is a chopper circuit, 103 is a charging voltage detection circuit, 104 is a charging current detection circuit, 105 is a cell voltage detection circuit, 106 is a lithium ion battery, 107 is a charging current calculation circuit, and 109 is a voltage controlled oscillator, which are same as in FIG. 1 and the explanations are not repeated. Reference numeral 208 is a calculating circuit, 210 is a peak hold circuit for holding the peak value of the cell voltage v. The charging current calculation circuit 107, the calculating circuit 208, the voltage controlled oscillator (VCO) 109 and peak hold circuit 210 constitute control means for controlling the chopper circuit 102, using each detected signal of the charging voltage detection circuit 103, the charging current detection circuit 104 and the cell voltage detection circuit 105. The control means outputs control signals to the charging control circuit 102 for controlling the charging current and the charging voltage, calculating the voltage a based on the charging current detected by the charging current detection circuit 103 and the charging voltage detected by the charging voltage detection circuit 105.

The operation of the thus constituted constant-current/constant-voltage battery charger is described below. In the calculating circuit 208, a fixed voltage value (upper limit of charging voltage) V1 for constant voltage charging, and a current value i1 which is a fixed current for constant current charging are predetermined.

When starting to charge, power source 101 is turned on and supplies an electric power, and the cell voltage detection circuit 105 detects the voltage value v of the lithium ion battery 106. The cell voltage value v and charging voltage value are put into the charging current calculation circuit 107, and the charging current calculation circuit 107 calculates the charging current value i on the basis of the previously stored resistance value of the charging current detection circuit 104. The peak hold circuit 210 holds the peak value vp (see FIG. 7) of the input cell voltage value v. The cell voltage value v, charging current value i, and peak value vp are put into the calculating circuit 208, and the calculating circuit 208 generates a control voltage a from these values. When the control voltage a is applied, the voltage controlled oscillator 109 generates a signal at a certain frequency depending on the control voltage a, and issues this oscillation signal b to the chopper circuit 102 to start the charging process. This results in a constant-current/constant-voltage battery charger which first charges at a constant current, and finally charges at the fixed cell voltage, that is, at a constant voltage at the upper limit of the charging voltage.

Thus, according to the exemplary embodiment, by charging according to the cell voltage being held by peak hold, if ripple components are contained in the cell voltage, the peak value of cell voltage may be controlled under the fixed cell voltage value, and overcharging of the lithium ion battery 106 may be prevented, such that the lithium ion battery 106 may be charged safely and securely.

Sixth exemplary embodiment

A constant-current/constant-voltage battery charger according to a sixth exemplary embodiment of the present invention is described below.

The constant-current/constant-voltage battery charger of the present exemplary embodiment has the same circuits as shown in FIG. 5. Only the operation of the calculating circuit 208 is different, and the operation is explained by mainly relating to the calculating circuit 208.

Figure 6:
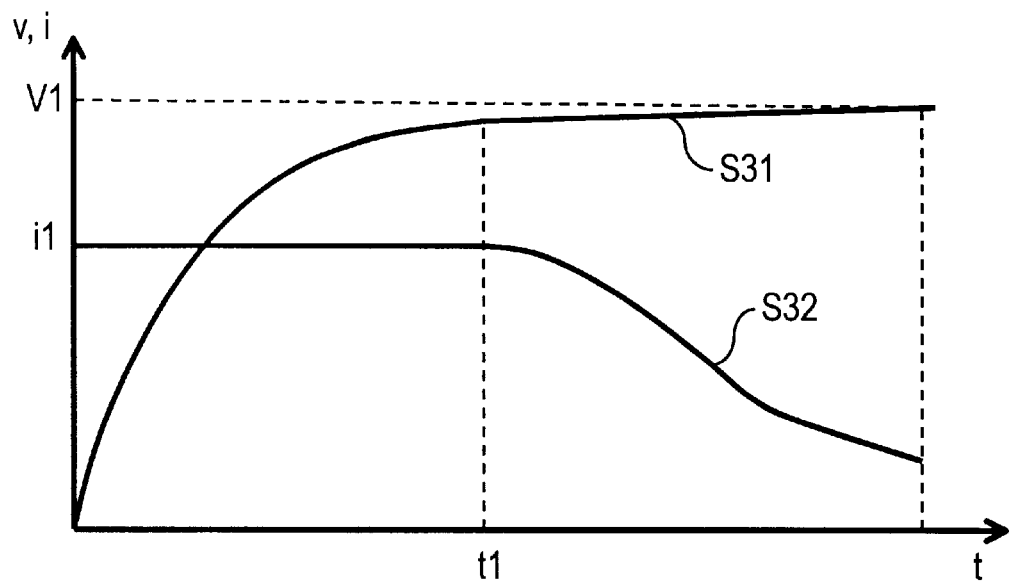
FIG. 6 is a graph showing characteristics of cell voltage and charging current according to the sixth exemplary embodiment of the present invention.

FIG. 6 is a graph showing characteristics of cell voltage v and charging current i with respect to charging time t according to the sixth exemplary embodiment of the invention. FIG. 7 is a graph showing cell voltage v and peak voltage vp with respect to charging time t in the sixth exemplary embodiment of the invention. In FIG. 6, S31 is a characteristic curve showing the cell voltage characteristic, and S32 is a characteristic curve showing the charging current characteristic. In FIG. 7, S41 is a characteristic curve showing the cell voltage waveform, S42 is a characteristic curve showing the output voltage of the peak hold circuit 210 represented by the dashed line, and vp is the peak value of the cell voltage at a certain time.

Figure 7:
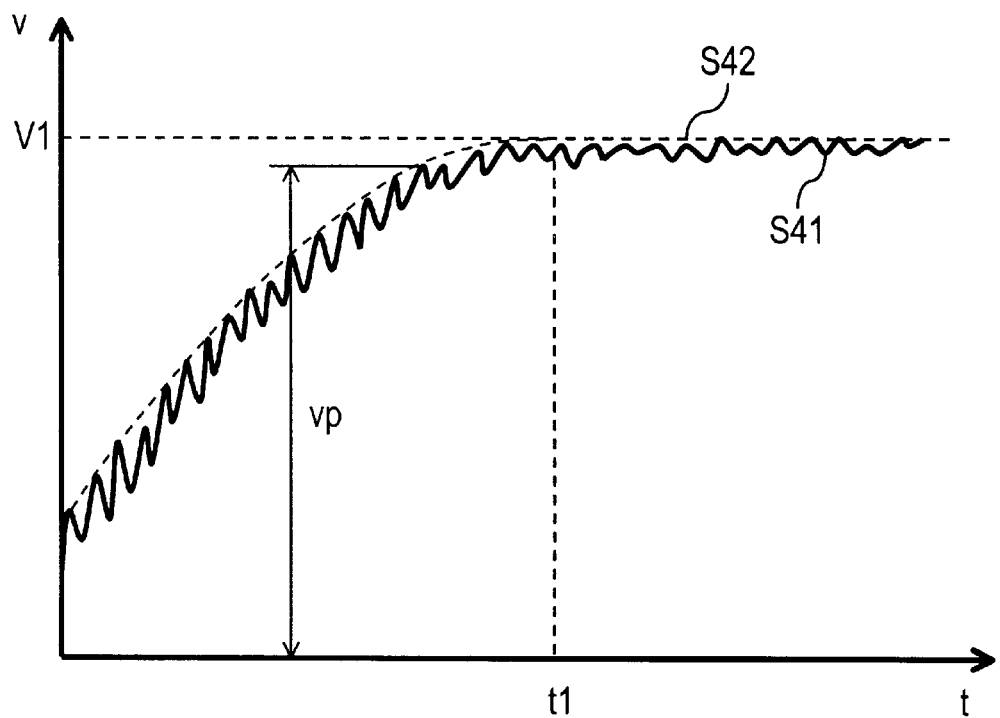
FIG. 7 is a graph showing cell voltage and peak voltage according to the sixth exemplary embodiment of the present invention.

Relating to the constant-current/constant-voltage battery charger having the characteristics in FIG. 6 and FIG. 7, the operation is described by mainly referring to the calculating circuit 208. In the calculating circuit 208, a fixed voltage value (upper limit of charging voltage) V1 for constant voltage charging, and a fixed current value i1 for constant current charging are predetermined. The calculating circuit 208 applies control voltage a to the voltage controlled oscillator 109 such that the cell voltage may be 4.1 V when charging the lithium ion battery having, for example, a negative electrode made of natural graphite material, or such that the cell voltage may be 4.2 V when charging the lithium ion battery 106 having a negative electrode made of coke material. Herein, the above value 4.1 V or 4.2 V is the fixed voltage value V1. When the control voltage a is applied, the voltage controlled oscillator 109 oscillates at a frequency corresponding to the control voltage a, and issues the oscillation signal b to the chopper circuit 102, thereby starting the charge process. When the cell voltage of the lithium ion battery 106 is lower than the output voltage of the chopper circuit 102, the charging current is determined by the difference of the two voltage and the resistance value of the charging current detection circuit 104, and charging is effected nearly at the fixed current value i1 as shown in FIG. 6. That is, the output voltage of the chopper circuit 102 is controlled such that the charging current value is nearly the fixed current value i1, while the cell voltage value increases with time and may become closer to the second fixed voltage value V2. Therefore, charging in this stage is constant current charging.

At this time, the peak value vp of the ripple component generated in the chopper circuit 102 is output to the calculating circuit 208, through the peak hold circuit 210. Control voltage a is applied from the calculating circuit 208 to the voltage controlled oscillator 109 and has a voltage value based on the peak value vp. That is, the calculating circuit 208 receives the peak value vp of the ripple component from the peak hold circuit 210, and generates control voltage a according to peak value vp. As a result, receiving the oscillation signal b at a frequency provided from the voltage controlled oscillator 109 to the chopper circuit 102, the cell voltage value v based on the charging voltage delivered from the chopper circuit 102 may not exceed the fixed voltage value V1. This mode is shown in FIG. 7. As shown in FIG. 7, the cell voltage follows the upper side envelope of the charging voltage including the ripple. That is, the cell voltage value v including ripple may not exceed the fixed voltage value V1. Therefore, the output voltage of the chopper circuit 102 may not reach the upper limit value V1 of the charging voltage, so that the lithium ion battery 106 may not be overcharged.

After the peak value vp of the cell voltage including ripple components has reached the fixed voltage value V1, control voltage a is applied from the calculating circuit 208 to the voltage controlled oscillator 109 such that the peak value vp of the cell voltage may be the fixed voltage V1, and the frequency of oscillation signal b is fixed such that the peak value vp of the cell voltage may be the fixed voltage V1, is applied from the voltage controlled oscillator 109 to the chopper circuit 102. At this time, too, the voltage vp including the peak value of ripple components generated in the chopper circuit 102 is put in the calculating circuit 208, and the peak value vp of the cell voltage based on the charging voltage issued from the chopper circuit 102 may not exceed the fixed voltage value V1. Therefore, the peak value vp of the cell voltage may not reach the upper limit V1 of the charging voltage, such that the lithium ion battery 106 may not be overcharged. As the battery 106 approaches full charge, the charging current value i decreases, such that the ripple components in the chopper circuit 102 decrease. Thus, the peak value vp of the cell voltage finally reaches the upper limit V1 as shown in FIG. 7. Therefore, the lithium ion battery 106 can be fully charged safely.

Thus, according to the present exemplary embodiment, by controlling the cell voltage on the basis of the peak value (cell voltage peak value ) vp, obtained by peak hold processing of the cell voltage, the peak value vp of the cell voltage may be fixed below the fixed voltage value V1. Furthermore, the ripple components of the chopper circuit 102 are extremely small, such that the peak value vp of the cell voltage may reach the upper limit value V1, thereby preventing overcharging of the lithium ion battery 106, and fully charging the lithium ion battery 106 safely and securely.

As described above, the invention comprises a power source for supplying electric power, a chopper circuit for controlling the charging current and charging voltage, a charging voltage detection circuit for detecting the charging voltage, a charging current detection circuit for detecting the charging current, a cell voltage detection circuit for detecting the cell voltage, a charging current calculation circuit for calculating the charging current from the detected values of cell voltage and charging voltage, a calculating circuit for issuing the control voltage for controlling the values of cell voltage and charging current from the detected cell voltage and calculated charging current, and a voltage controlled oscillator for issuing the oscillation signal to the chopper circuit at a frequency depending on the control voltage. Therefore, it presents a constant-current/constant-voltage battery charger capable of charging the lithium ion battery safely and securely without overcharging, by sufficiently charging at low constant voltage or low constant current, and then charging at the upper limit of the charging voltage, such that charging may be done at the point of high control precision of the chopper circuit.

The calculating circuit holds a first voltage value which is a fixed voltage value for constant voltage charging, a second voltage value smaller than the first voltage value, a first current value which is a fixed current value for constant current charging, and a second current value smaller than the first current value. The calculating circuit performs constant current charging at the first current value until the cell voltage reaches the second voltage value, followed by constant voltage charging at the second voltage value when the cell voltage reaches the second voltage value. The calculating circuit then performs constant current charging at the first current value again when the charging current reaches the second current value, followed once again by constant voltage charging at the first voltage value when the cell voltage reaches the first voltage value. Thereby sufficiently charging at the second voltage value lower than the first voltage value which is the fixed voltage value of constant voltage charging, and then charging at the first voltage value. Therefore, the charging current is small and charging is almost full, such that the battery may be charged at a constant voltage with small ripple components by the first voltage value. Hence, the battery may not be overcharged by the ripple components, and the ripple components decrease as the value of the cell voltage approaches the fixed voltage value, such that a constant-current/constant-voltage battery charger capable of charging fully may be realized.

Moreover, the calculating circuit holds a fixed voltage value for constant voltage charging, a first current value which is a fixed current value for initial constant current charging, a second current value smaller than the first current value, and a third current value smaller than the first current value and larger than the second current value. The calculating circuit controls the performance of constant current charging at the first current value until the cell voltage reaches the fixed voltage value, and constant current charging at the third current value when the cell voltage reaches the fixed voltage value. The calculating circuit further controls the performance of constant voltage charging at the first voltage value when the cell voltage again reaches the fixed voltage value until the charging current reaches the second current. Thereby, sufficiently charging at the constant current lower than the fixed current value for initial constant current charging, and then charging at the fixed voltage value. Therefore, the charging current is small and charging is almost full, such that the battery can be charged at a constant voltage having small ripple components by the fixed voltage value. Hence, the battery may not be overcharged by the ripple components, and the ripple components decrease as the value of the cell voltage approaches the fixed voltage value, such that a constant-current/constant-voltage battery charger capable of charging fully may be realized.

Further, the calculating circuit holds a first voltage value which is a fixed voltage for constant voltage charging, a second voltage value smaller than the first voltage value, a first current value which is a fixed current value for initial constant current charging, a second current value smaller than the first current value, and a third current value smaller than the first current value and larger than the second current value. The calculating circuit also controls the performance of i) constant current charging at the first current value until the cell voltage reaches the second voltage value, ii) constant current charging at the third current value when the cell voltage reaches the second voltage value, and iii) constant voltage charging at the first voltage value when the cell voltage reaches the first voltage value until the value of the charging current reaches the second current value. Thereby, sufficiently charging at the constant current lower than the fixed current value for initial constant current charging, and then charging at the first voltage value. Therefore, the charging current is small and charging is almost full, such that the battery can be charged at a constant voltage having small ripple components by the first voltage value. Hence, the battery may not be overcharged by the ripple components, and the ripple components decrease as the value of the cell voltage approaches the fixed voltage value, such that a constant-current/constant-voltage battery charger capable of charging fully may be realized.

Still further, the charger comprises a power source for generating electric power, a chopper circuit for controlling the charging current and charging voltage, a charging voltage detection circuit for detecting the charging voltage, a charging current detection circuit for detecting the charging current, a cell voltage detection circuit for detecting the cell voltage, a charging current calculation circuit for calculating the charging current from the detected values of cell voltage and charging voltage, a peak hold circuit for holding the peak value of the detected cell voltage, a calculating circuit for issuing the control voltage for controlling the values of cell voltage and charging current from the detected cell voltage, a calculated charging current and held peak value of cell voltage, and a voltage controlled oscillator for issuing an oscillation signal at a frequency depending on the control voltage to the chopper circuit. Therefore, it presents a constant-current/constant-voltage battery charger capable of charging a lithium ion battery safely and securely without overcharging the lithium ion battery, by controlling the peak value of the cell voltage under the fixed voltage value if ripple components are included in the cell voltage.

Furthermore, the calculating circuit holds a fixed voltage value for constant voltage charging and a fixed current value for constant current charging, and controls the performance of i) constant current charging at the fixed current value until the held peak value of the cell voltage reaches the fixed voltage value, and ii) constant voltage charging at the fixed voltage value when the held peak value of the cell voltage reaches the fixed voltage value. Thereby controlling the cell voltage according to the held peak value of the cell voltage, such that the value of the cell voltage may be always fixed below the fixed voltage value. Therefore, the constant-current/constant-voltage battery charger capable of charging fully without overcharging while decreasing the ripple components as the value of the cell voltage approaches the fixed voltage value may be realized.

Although preferred embodiments of the invention have been shown and described, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A battery charger for use with a power source and a battery, the charger comprising:
    a charging control circuit for charging the battery by controlling a current and a voltage supplied by said power source,
    a charging current detection circuit for detecting a current value for charging the battery,
    a charging voltage detection circuit for detecting a voltage value for charging the battery, and
    control means for holding
        i) a first fixed voltage value not greater than an upper limit of charging voltage of the battery for constant voltage charging,
        ii) a second fixed voltage value smaller than said first fixed voltage value,
        iii) a first fixed current value for constant current charging, and
        iv) a second fixed current value of a smaller value than said first fixed current value,
    for controlling said charging control circuit to perform i) constant current charging at said first fixed current value until the voltage value detected by said charging voltage detection circuit reaches said second fixed voltage value, ii) constant voltage charging at said second fixed voltage value when the voltage value detected by said charging voltage detection circuit reaches said second fixed voltage value, iii) constant current charging at said first fixed current value again when the current value detected by said charging current detection circuit drops to said second fixed current value, and iv) constant voltage charging at said first fixed voltage value after the voltage value detected by said charging voltage detection circuit reaches said first fixed voltage value.

2. A battery charger as defined in claim 1, wherein said control means controls said charging control circuit so as to perform constant voltage charging at said first fixed voltage value after the voltage value detected by said charging voltage detection circuit reaches said first fixed voltage value until the charging current value for said constant voltage charging at said first fixed voltage reaches said second fixed current value.

3. A battery charger as defined in claim 1, wherein said charging control circuit is a chopper circuit.

4. A battery charger as defined in claim 2, wherein said charging control circuit is a chopper circuit.

5. A battery charger for use with a power source for charging a battery in a constant current and constant voltage sequence, the charger comprising:
    a charging control circuit for charging the battery by controlling a current and a voltage from said power source,
    charging current detection circuit for detecting a current value for charging the battery,
    a charging voltage detection circuit for detecting a voltage value for charging the battery, and
    control means having
        i) a fixed voltage value not greater than an upper limit of charging voltage of the battery for constant voltage charging,
        ii) a first fixed current value for initial constant current charging,
        iii) a second fixed current value of a smaller value than said first fixed current value, and
        iv) a third fixed current value smaller than said first fixed current value and larger than said second fixed current value,
    for controlling said charging control circuit to perform i) first constant current charging at said first fixed current value until the voltage value detected by said charging voltage detection circuit reaches said fixed voltage value, ii) second constant current charging at said third fixed current value after the voltage value detected by said charging voltage detection circuit reaches said fixed voltage value, and iii) constant voltage charging at said fixed voltage value after the voltage value detected by said charging current detection circuit reaches said fixed voltage value.

6. A battery charger as defined in claim 5, wherein said control means controls said charging control circuit so as to perform constant voltage charging at said fixed voltage value after the voltage value detected by said charging voltage detection circuit reaches said fixed voltage value until the charging current value for said constant voltage charging at said fixed voltage reaches said second fixed current value.

7. A battery charger as defined in claim 5, wherein said charging control circuit is a chopper circuit.

8. A battery charger as defined in claim 6, wherein said charging control circuit is a chopper circuit.

9. A battery charger for use with a power source for charging a battery using a constant current and a constant voltage sequence, the charger comprising:
    a charging control circuit for charging the battery by controlling a current and a voltage from said power source,
    a charging current detection circuit for detecting a current value for charging the battery,
    a charging voltage detection circuit for detecting a voltage value for charging the battery, and
    control means having
        i) a first fixed voltage value not greater than an upper limit of charging voltage of the battery for constant voltage charging, ii) a second fixed voltage value smaller than said first fixed voltage value, iii) a first fixed current value for initial constant current charging, iv) a second fixed current value smaller than said first fixed current value, and v) a third fixed current value smaller than said first fixed current value and larger than said second fixed current value, for controlling said charging control circuit to perform i) first constant current charging at said first fixed current value until the voltage value detected by said charging voltage detection circuit reaches said second fixed voltage value, ii) second constant current charging at said third fixed current value after the voltage value detected by said charging voltage detection circuit reaches said second fixed voltage value, and iii) constant voltage charging at said first fixed voltage value after the voltage value detected by said charging voltage detection circuit reaches said first fixed voltage value.

10. A battery charger as defined in claim 9, wherein said control means controls said charging control circuit so as to perform constant voltage charging at said first fixed voltage value after the voltage value detected by said charging voltage detection circuit reaches said first fixed voltage value until the charging current value for constant voltage charging at said first fixed voltage reaches said second fixed current value.

11. A battery charger as defined in claim 9, wherein said charging control circuit is a chopper circuit.

12. A battery charger as defined in claim 10, wherein said charging control circuit is a chopper circuit.

13. A battery charger for use with a power source and a battery, the charger comprising:

a charging control circuit for charging the battery by controlling at least one of a current and a voltage from said power source, a charging current detection circuit for detecting a charging current for charging the battery, a charging voltage detection circuit for detecting a charging voltage for charging the battery, a peak hold circuit for holding a maximum value of the charging voltage detected by said charging voltage detection circuit, and control means for controlling said charging control circuit to control values of the i) charging voltage detected by said charging voltage detection circuit, ii) the charging current detected by said charging current detection circuit, and iii) the maximum value held by said peak hold circuit.

14. A battery charger as defined in claim 13, wherein said charging control circuit is a chopper circuit.

15. A battery charger for use with a power source and a battery, the charger comprising:

a charging control circuit for charging the battery by controlling current and voltage using the supplied electric power from said power source, a charging current detection circuit for detecting a charging current for charging the battery, a charging voltage detection circuit for detecting a charging voltage for charging the battery, a peak hold circuit for holding a maximum value of the charging voltage detected by said charging voltage detection circuit, and control means having i) a fixed voltage value for constant voltage charging and ii) a fixed current value for constant current charging, for controlling constant current charging at the fixed current value until the voltage value held by said peak hold circuit reaches said fixed voltage value, and constant voltage charging at said fixed voltage value after the voltage value held by said peak hold circuit reaches said fixed voltage.

16. A battery charger as defined in claim 15, wherein said charging control circuit is a chopper circuit.

* * * * *